(12) United States Patent
Yamanaka

(10) Patent No.: US 9,401,006 B2
(45) Date of Patent: Jul. 26, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yohei Yamanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/694,907

(22) Filed: Apr. 23, 2015

(65) Prior Publication Data

US 2015/0310589 A1 Oct. 29, 2015

(30) Foreign Application Priority Data

Apr. 25, 2014 (JP) ................. 2014-091875

(51) Int. Cl.
*G06T 3/40* (2006.01)
*H04N 9/07* (2006.01)

(52) U.S. Cl.
CPC ............. *G06T 3/4015* (2013.01); *H04N 9/07* (2013.01)

(58) Field of Classification Search
CPC ............................. G06T 3/4007; H04N 9/07
See application file for complete search history.

(56) References Cited

U.S. PATENT DOCUMENTS

| | | | |
|---|---|---|---|
| 5,886,745 A | 3/1999 | Muraji et al. | |
| 7,123,781 B2 | 10/2006 | Maenaka et al. | |
| 2010/0265352 A1* | 10/2010 | Nashizawa | G06T 3/4015 348/222.1 |
| 2010/0302416 A1 | 12/2010 | Kawashima | |
| 2011/0069192 A1* | 3/2011 | Sasaki | H04N 9/045 348/222.1 |
| 2013/0093925 A1* | 4/2013 | Nashizawa | G06T 3/4015 348/239 |
| 2015/0312551 A1 | 10/2015 | Hosaka | |

FOREIGN PATENT DOCUMENTS

JP 2008-035470 A 2/2008

* cited by examiner

*Primary Examiner* — James Hannett

(74) *Attorney, Agent, or Firm* — Canon USA, Inc. I.P. Division

(57) ABSTRACT

A demosaicing unit interpolates mosaic image data of each pixel of interest so as to reproduce colors missing at each pixel by interpolation using neighboring pixels. In the demosaicing unit, an interpolation unit performs an interpolation process in a plurality of prescribed directions using neighboring pixels in the prescribed directions. An evaluation unit evaluates image data in each prescribed directions interpolated by the interpolation unit. A spurious resolution area judgment unit judges whether a pixel is in a spurious resolution area, on a pixel-by-pixel basis, based on a saturation detected from image data subjected to an interpolation process performed so as to preserve an edge component. An image generation unit selects image data to be interpolated for each pixel based on a result of the evaluation by the evaluation unit and a result of the judgment by the spurious resolution area judgment unit, and generates interpolated image data.

13 Claims, 17 Drawing Sheets

FIG. 4

| R11 | G12 | R13 | G14 | R15 | G16 |
| --- | --- | --- | --- | --- | --- |
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |
| G61 | B62 | G63 | B64 | G65 | B66 |

FIG. 7

|   |   | C<br>−1 |   |   |
|---|---|---|---|---|
|   |   | G<br>1 |   |   |
| C<br>−1 | G<br>1 | C<br>4 | G<br>1 | C<br>−1 |
|   |   | G<br>1 |   |   |
|   |   | C<br>−1 |   |   |

FIG. 16A

|   |   | C |   |   |
|---|---|---|---|---|
|   |   | G |   |   |
| C<br>−1 | G<br>1 | C | G<br>1 | C<br>1 |
|   |   | G |   |   |
|   |   | C |   |   |

FIG. 16B

|   |   | C<br>−1 |   |   |
|---|---|---|---|---|
|   |   | G<br>1 |   |   |
| C | G | C | G | C |
|   |   | G<br>1 |   |   |
|   |   | C<br>1 |   |   |

FIG. 17
PRIOR ART

| R | G | R | G |
|---|---|---|---|
| G | B | G | B |
| R | G | R | G |
| G | B | G | B |

IMAGE PROCESSING APPARATUS, IMAGE PROCESSING METHOD, AND STORAGE MEDIUM

BACKGROUND OF THE INVENTION

1. Field of the Invention

The present inventions relate to at least one image processing apparatus, at least one image processing method, at least one program, and at least one computer-readable storage medium for storing the at least one program, and more particularly, to interpolation techniques of a color image signal.

2. Description of the Related Art

In a conventional color image sensor, a Bayer pattern color filter array such as that illustrated in FIG. 17 is used. The color filter array may be a three primary color filter array including array elements of three colors of red (R), green (G), and blue (B), or a complementary color filter array including array elements of three colors of cyan, magenta, and yellow.

However, in the Bayer pattern color filter array, each pixel is allowed to obtain a signal of only one of three colors, and thus signals of the other two colors are missed. Therefore, to reproduce signals of the other two colors missing at each pixel, a demosaicing (interpolation) process is performed. Specific examples of known techniques for the demosaicing process include bilinear interpolation, bicubic interpolation, and the like. The bilinear or bicubic interpolation achieves good interpolation for an image in which low frequency components are dominant. However, for an image including a high frequency component, there is a possibility that the bilinear or bicubic interpolation generates a line or a color called a spurious resolution or a false color (color moire) that does not actually exist in an object. Such a spurious resolution or a false color may occur when demosaicing is performed using pixels in a direction different from a direction in which an edge of an object image extends.

In view of the above, it has been proposed to perform demosaicing using pixels along a direction of an edge of an object image. The demosaicing method using pixels along an edge direction is roughly classified into two methods. A first method is disclosed, for example, in Japanese Patent Laid-Open No. 2008-35470. In this method, an edge direction is detected using neighboring pixels, and interpolation is performed not across the edge but along the edge direction. Japanese Patent Laid-Open No. 2008-35470 also discloses a second interpolation method. In this second method, first, interpolation is performed separately in a plurality of directions to obtain a plurality of interpolation results. Thereafter the interpolation results are evaluated to select a best direction in which the interpolation is to be performed. It has been proposed to evaluate the properness of the interpolation direction such that an evaluation value representing uniformity among neighboring pixels including a pixel of interest is determined. A direction in which uniformity is high is determined as being an edge direction, and this direction is selected as an interpolation direction.

However, in the methods disclosed in Japanese Patent Laid-Open No. 2008-35470, there is a possibility that when an image has a component close to a resolution limit in which a pitch of a fine part of an object is close to a pixel pitch of an image sensor, the calculated evaluation value of the uniformity may be incorrect, which may result in an interpolation error which in turn may cause a spurious resolution to occur.

SUMMARY OF THE INVENTION

The present inventions provide at least one technique of performing a demosaicing process on an image signal with high accuracy.

According to an aspect of one or more embodiments of the inventions, at least one image processing apparatus configured to process mosaic image data produced via a photoelectric conversion on an optical image of an object image by an image sensor including a color filter having a plurality of colors, the mosaic image data having image data of pixels each corresponding to one of the plurality of colors of the color filter, includes a first interpolation unit configured to perform an interpolation process on a pixel-by-pixel basis on a pixel of interest using image data of pixels located close to the pixel of interest in each of a plurality of prescribed directions so as to reproduce image data of colors missing at the pixel of interest, an evaluation unit configured to evaluate the image data in each prescribed direction subjected to the interpolation process by the first interpolation unit, a second interpolation unit configured to perform an interpolation process so as to preserve an edge component (e.g., of the image data, of the object image, of the optical image of the object image, etc.), a saturation detection unit configured to detect a saturation from the image data subjected to the interpolation process by the second interpolation unit, a judgment unit configured to judge whether a pixel is in an area in which a spurious resolution may occur, on a pixel-by-pixel basis based on the saturation detected by the saturation detection unit, and an image generation unit configured to select image data to be interpolated for each pixel based on a result of the evaluation by the evaluation unit and a result of the judgment by the judgment unit, and to generate interpolated image data with the plurality of colors.

According to other aspects of the present inventions, one or more image processing apparatuses, one or more image processing methods, one or more programs and one or more storage mediums are discussed herein. Further features of the present inventions will become apparent from the following description of exemplary embodiments with reference to the attached drawings.

BRIEF DESCRIPTION OF THE DRAWINGS

FIG. 4 is a diagram illustrating a pixel arrangement according to a Bayer pattern for use in illustrating a direction-dependent interpolation process.

FIG. 7 is a diagram illustrating an example of a set of filter coefficients used by a saturation detection G interpolation unit.

FIG. 16A is a diagram illustrating an example of a set of filter coefficients used by a saturation detection GH interpolation unit, and FIG. 16B is a diagram illustrating an example of a set of filter coefficients used by a saturation detection GV interpolation unit.

FIG. 17 is a diagram illustrating an example of a pixel arrangement according to a Bayer pattern.

DESCRIPTION OF THE EMBODIMENTS

Embodiments of the present inventions are described below with reference to the drawings.

First Embodiment

A first embodiment is described below.

Figure 1:
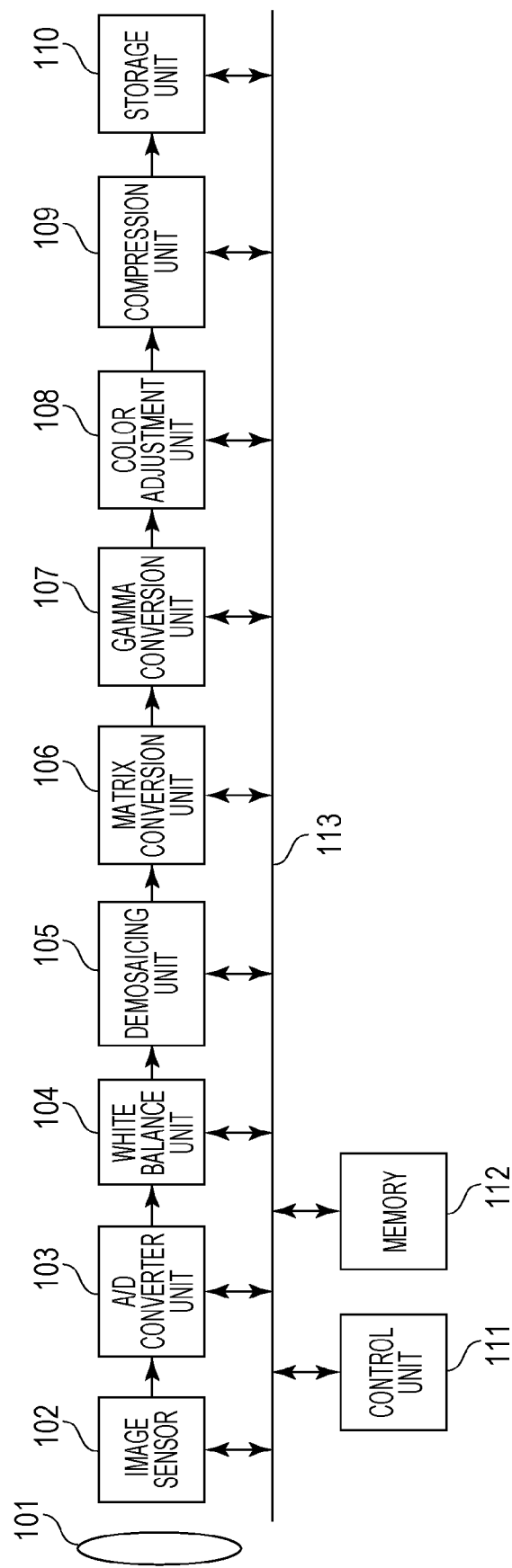
FIG. 1 is a diagram illustrating an example of a configuration of an image pickup apparatus according to at least one embodiment.

FIG. 1 is a block diagram illustrating an example of a configuration of an image pickup apparatus including an image processing apparatus according to the first embodiment. An optical image (object image) of an object is focused on an image sensor 102 via an imaging lens 101 and converted from an optical signal to an electric signal.

Figure 17:
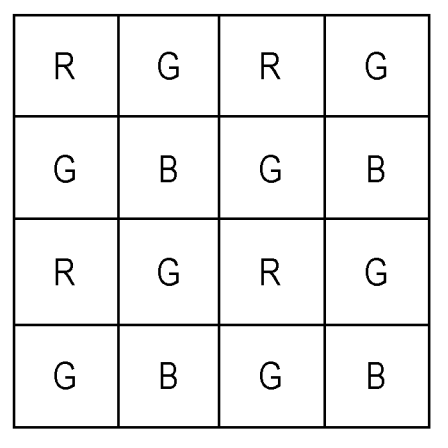

The image sensor 102 is a single-plate color image sensor having a multi-color filter. The color filter may be a three primary color filter array including array elements of three primary colors of red (R), green (G), and blue (B), respectively, having transparent dominant wavelength bands centered at about 650 nm, 550 nm, and 450 nm, which the color filter is capable of generating color planes respectively corresponding to the three primary colors. In the single-plate color image sensor, color filter elements may be spatially arranged in such a manner as illustrated in FIG. 17, and thus, in such a manner, each pixel is allowed to obtain a light intensity only in one of the color planes. Therefore, an image signal output from the image sensor 102 is a mosaic image signal, that is, an image signal output from each pixel lacks two colors of the three primary colors.

An analog-digital (A/D) converter unit 103 converts the mosaic image signal output from the image sensor 102 such that an analog voltage of the mosaic image signal is converted to digital image data. A white balance unit 104 performs a while balance process. More specifically, the white balance unit 104 gains R, G, and B color signals such that the R, G, and B color signals have equal signal levels in areas in which the color is supposed to be white.

A demosaicing unit 105 performs interpolation on color mosaic image data such that two colors of the three primary colors missing in image data at each pixel are reproduced by interpolation and such that a color image is generated in which any of all pixels has image data of all three primary colors, that is, R, G, and B colors. The color image data of each pixel is subjected to a matrix conversion process performed by a matrix conversion unit 106, and then subjected to a gamma correction process performed by a gamma conversion unit 107 such that basic color image data is/are generated. The basic color image data is then subjected to various processes performed by a color adjustment unit 108 to improve image quality. More specifically, for example, the color adjustment unit 108 performs various color adjustment processes such as noise reduction, saturation enhancement, hue adjustment, edge enhancement, and/or the like. A compression unit 109 compresses the color-adjusted color image data into a JPEG format or the like such that the data size of data to be stored is reduced.

The processing operations performed by a sequence of functional units from the image sensor 102 to the compression unit 109 are controlled by a control unit 111 via a bus 113. When the control unit 111 controls the processing operations described above, the control unit 111 may use a memory 112 as required. The digital image data compressed by the compression unit 109 is stored in a storage medium, such as a flash memory or the like, by a storage unit 110 under the control of the control unit 111.

Figure 2:
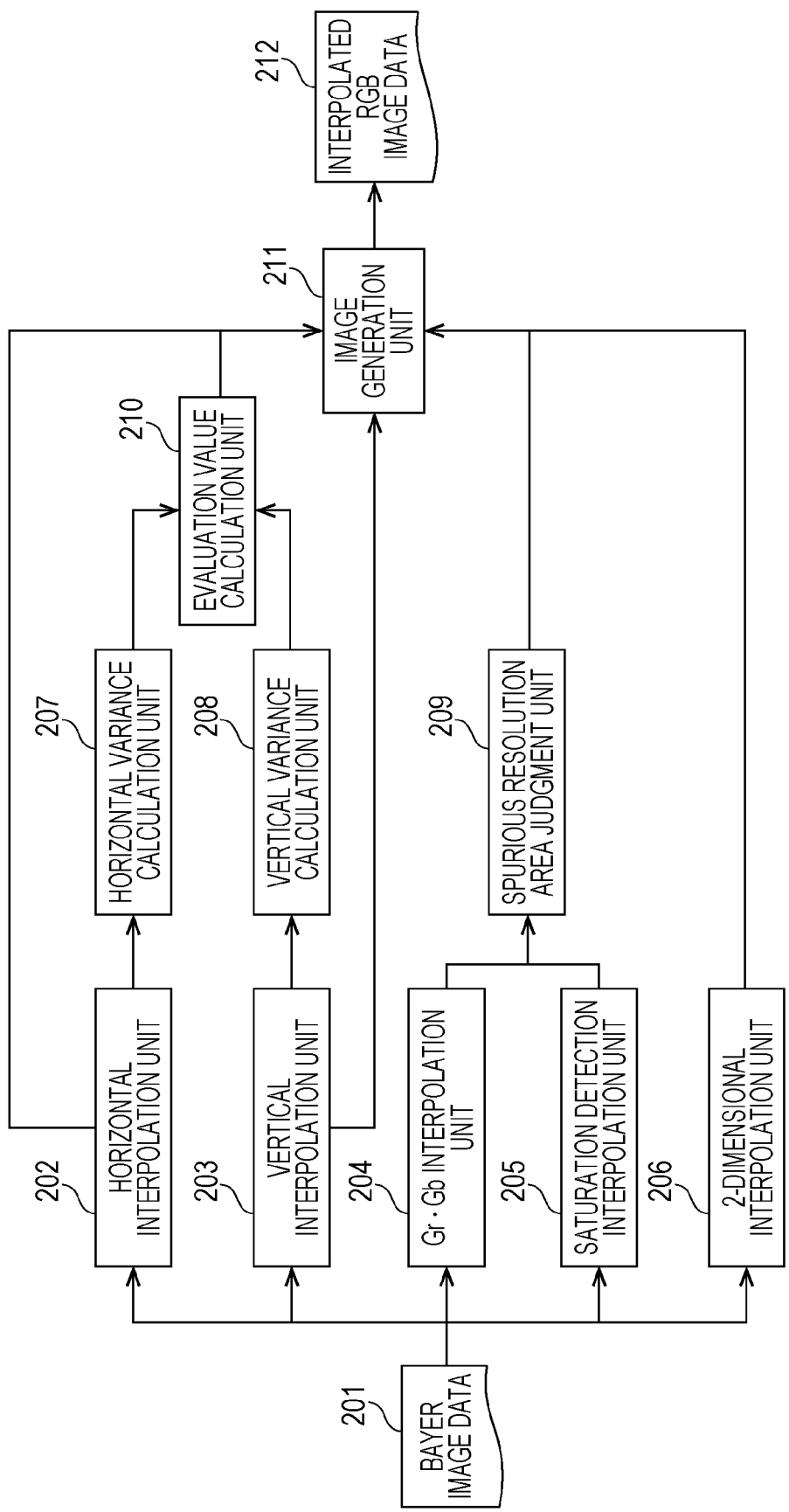
FIG. 2 is a diagram illustrating an example of a configuration of a demosaicing unit according to an embodiment.

Next, the demosaicing process performed by the demosaicing unit 105 is described in further detail below with reference to FIG. 2. FIG. 2 is a diagram illustrating an example of a configuration of the demosaicing unit 105 according to the present embodiment. First, the demosaicing unit 105 performs interpolation on a pixel of interest (or at least one pixel of interest, e.g., when each pixel is processed (as a pixel of interest in each iteration of the process) for a plurality of pixels, at least one pixel of interest or a plurality of pixels of interest may be processed or interpolated) in each of a plurality of prescribed directions using pixels located close to the pixel of interest, and then the demosaicing unit 105 selects a direction. As a result of the interpolation process, color image data of three primary colors of R, G, and B is obtained for each pixel.

More specifically, the demosaicing unit 105 performs interpolation on input Bayer image data 201 such that pixel data of missing colors of each pixel is reproduced using a horizontal interpolation unit 202 from pixel data of neighboring pixels in a horizontal direction so that horizontally-interpolated RGB image data for each pixel is/are generated. In the Bayer image data 201, image data of two colors of three primary colors is missing at each pixel. Furthermore, the demosaicing unit 105 performs interpolation on the Bayer image data 201 such that pixel data of missing colors of each pixel is reproduced using a vertical interpolation unit 203 from pixel data of neighboring pixels in a vertical direction so that vertically-interpolated RGB image data for each pixel is/are generated.

Next, the demosaicing unit 105 calculates, using a horizontal variance calculation unit 207, a variance of each pixel from the horizontally interpolated RGB image data generated by the horizontal interpolation unit 202. Furthermore, the demosaicing unit 105 calculates, using a vertical variance calculation unit 208, a variance of each pixel from the vertically interpolated RGB image data generated by the vertical interpolation unit 203. Thereafter, the demosaicing unit 105 calculates, using an evaluation value calculation unit 210, a horizontal evaluation value and a vertical evaluation value, i.e., an evaluation value from each of the horizontal and vertical variances calculated, respectively, by the horizontal variance calculation unit 207 and the vertical variance calculation unit 208.

To detect and correct a spurious resolution area, the demosaicing unit 105 interpolates pixel data of each color using a Gr/Gb interpolation unit 204, a saturation detection interpolation unit 205, and a two-dimensional interpolation unit 206. More specifically, the Gr/Gb interpolation unit 204 generates Gr image data and Gb image data, and the saturation detection interpolation unit 205 and the two-dimensional interpolation unit 206 generates RGB image data. The demosaicing unit 105 determines, on a pixel-by-pixel basis, using a spurious resolution area judgment unit 209, whether a pixel is in a spurious resolution area in which a spurious resolution may occur, based on the image data output respectively from the Gr/Gb interpolation unit 204 and the saturation detection interpolation unit 205.

An image generation unit 211 compares the horizontal and vertical evaluation values calculated by the evaluation value calculation unit 210, and determines in which direction a higher evaluation value of the interpolation is obtained, that is, determines which evaluation value is higher between the evaluation value of the horizontal interpolation or the evaluation value of the vertical interpolation and selects a direction in which the higher evaluation value is obtained. In this selection, when a pixel is determined as being in a spurious resolution area by the spurious resolution area judgment unit 209, the image generation unit 211 selects a two-dimensional interpolation for this pixel. The image generation unit 211 then generates interpolated image data based on the interpolated RGB image data in the selected direction, and outputs the result as the interpolated RGB image data 212, that is, demosaiced data.

Figure 3:
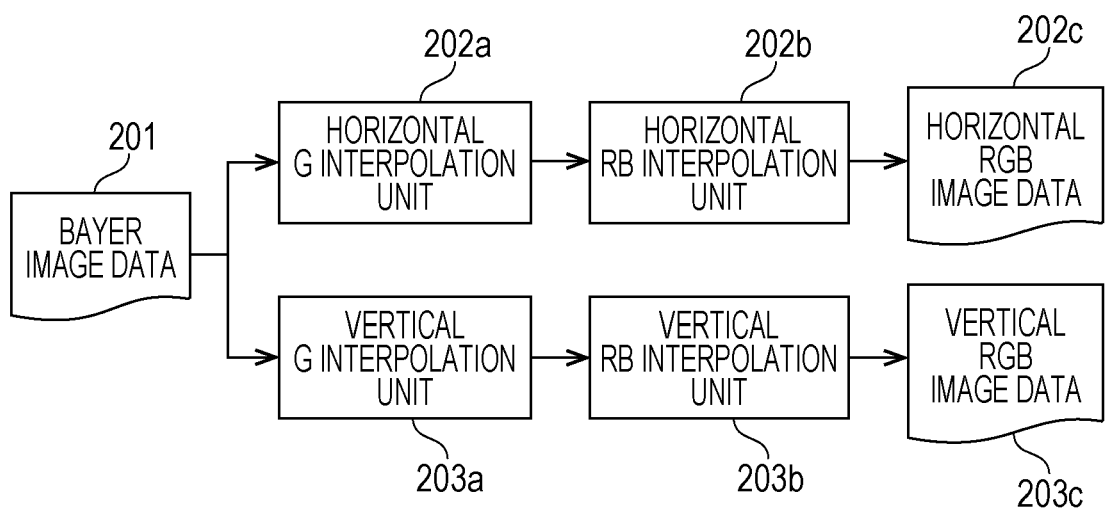
FIG. 3 is a diagram illustrating an example of a configuration of at least one embodiment of a horizontal interpolation unit and that of at least one embodiment of a vertical interpolation unit illustrated in FIG. 2.

Referring to FIG. 3, a direction-specific interpolation process performed by at least one embodiment of the horizontal interpolation unit 202 and at least one embodiment of the vertical interpolation unit 203 is described in further detail below. FIG. 3 illustrates an example of a configuration of at least one embodiment of the horizontal interpolation unit 202 and that of at least one embodiment of the vertical interpolation unit 203. As illustrated in FIG. 3, the horizontal interpolation unit 202 includes a horizontal G interpolation unit 202*a* and a horizontal RB interpolation unit 202*b*, and the vertical interpolation unit 203 includes a vertical G interpolation unit 203*a* and a vertical RB interpolation unit 203*b*.

In the horizontal interpolation unit 202, first, the horizontal G interpolation unit 202*a* interpolates G data in a high frequency band. Next, the horizontal RB interpolation unit 202*b* interpolates R data and B data. As a result, horizontally interpolated RGB image data 202*c* is generated. Similarly, in the vertical interpolation unit 203, first, the vertical G interpolation unit 203*a* interpolates G data in a high frequency band. Next, the vertical RB interpolation unit 203*b* interpolates R data and B data. As a result, vertically interpolated RGB image data 203*c* is generated.

A specific method of the direction-dependent interpolation process is described below with reference to FIG. 4. In the interpolation of G data, if a pixel of interest is associated with a G filter color, G data of this pixel is directly output (formula (1) shown below). In the interpolation of G data, if a pixel of interest is associated with an R filter color or a B filter color, the interpolated data in the horizontal direction is calculated according to formula (2) shown below, while the interpolated data in the vertical direction is calculated according to formula (3) shown below. Note that in equations (1), (2), and (3), superscripts of G33, G34, G43, and G44 respectively correspond to superscripts of symbols of pixels defined for convenience in FIG. 4 (and elsewhere in the following description). For example, G33 denotes interpolated G data of a pixel R33, G44 denotes interpolated G data of a pixel B44, and so on.

$$\begin{cases} G34 = G34 \\ G43 = G43 \end{cases} \tag{1}$$

$$\begin{cases} G33 = \dfrac{(-R31 + 2 \cdot G32 + 2 \cdot R33 + 2 \cdot G34 - R35)}{4} \\ G44 = \dfrac{(-B42 + 2 \cdot G43 + 2 \cdot B44 + 2 \cdot G45 - B36)}{4} \end{cases} \tag{2}$$

$$\begin{cases} G33 = \dfrac{(-R13 + 2 \cdot G23 + 2 \cdot R33 + 2 \cdot G43 - R53)}{4} \\ G44 = \dfrac{(-B24 + 2 \cdot G34 + 2 \cdot B44 + 2 \cdot G54 - B64)}{4} \end{cases} \tag{3}$$

In the interpolation of R data, when a pixel of interest is a pixel associated with the R filter color, the R data of this pixel is directly output (formula (4) shown below). In the interpolation of R data, when a pixel of interest is a pixel associated with the G filter color, the interpolated data is calculated according to formula (5) shown below. On the other hand, in the interpolation of R data, when a pixel of interest is a pixel associated with the B filter color, the interpolated data is calculated according to formula (6) shown below. In the interpolation of R data, the same formula is used for both horizontal and vertical directions. In the interpolation of B data, a similar method to that for the interpolation of R data may be used. More specifically, in the formulae (4) to (6) shown below, R may be replaced by B for the calculation of B data.

$$\{R33 = R33 \tag{4}$$

$$\begin{cases} R34 = \dfrac{((R33 - G33) + (R35 - G35))}{2} + G34 \\ R43 = \dfrac{((R33 - G33) + (R53 - G53))}{2} + G43 \end{cases} \tag{5}$$

$$\left\{ R44 = \dfrac{((R33 - G33) + (R35 - G35) + (R53 - G53) + (R55 - G55))}{4} + G44 \tag{6}\right.$$

Figure 5:
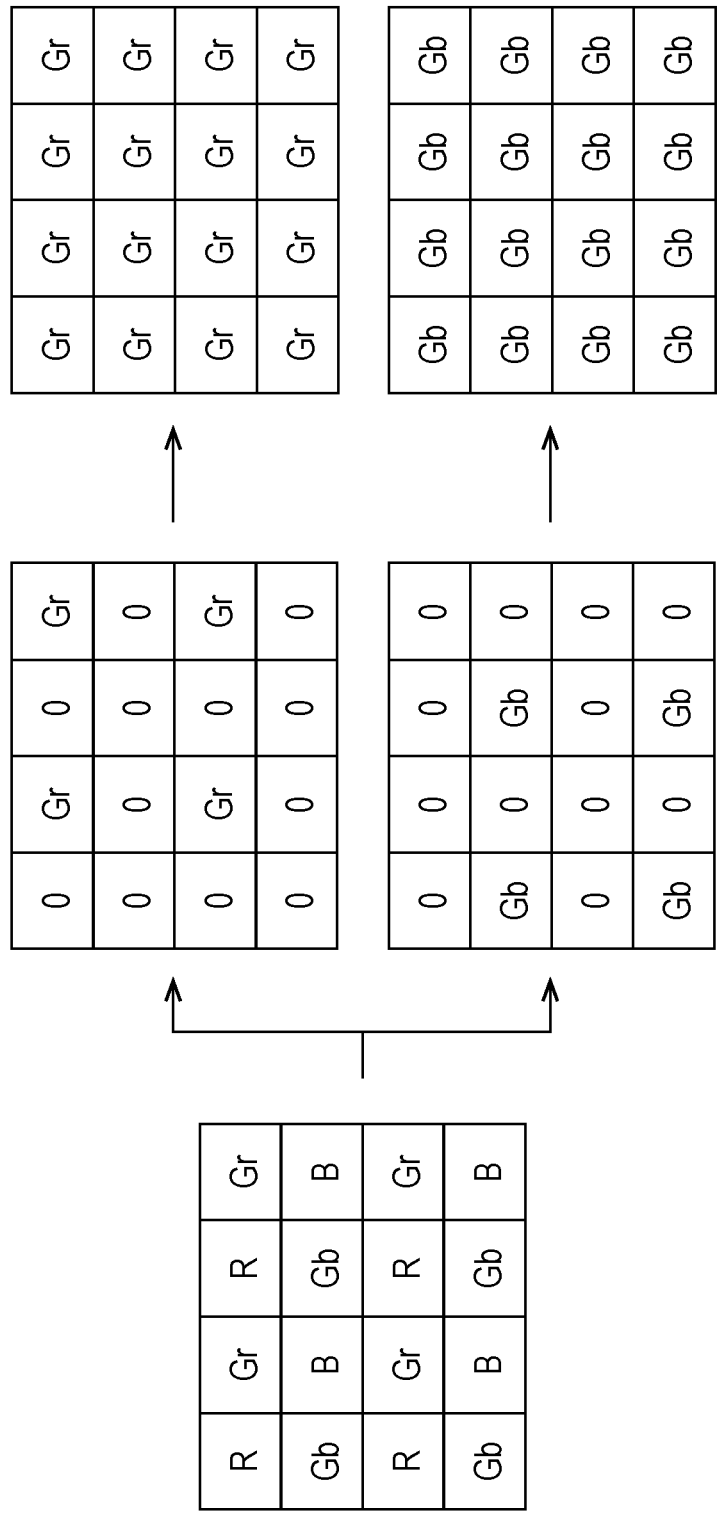
FIG. 5 is a diagram illustrating a process performed by a Gr/Gb interpolation unit.

In the demosaicing unit 105 according to the present embodiment, as described above, in addition to the interpolation in the respective prescribed directions, interpolation is performed to detect and correct a spurious resolution. The Gr/Gb interpolation unit 204 processes the input Bayer image data 201 of each pixel such that the interpolated Gr data is calculated using only Gr pixels and the interpolated Gb data is calculated using only Gb pixels. Note that herein Gr pixels are each a G pixel located horizontally adjacent to an R pixel, while Gb pixels are each a G pixel located horizontally adjacent to a B pixel. The Gr/Gb interpolation unit 204 extracts image data including only Gr pixels and image data including only Gb pixels from the Bayer image data 201 as illustrated in FIG. 5. Note that in this process, 0 is given as a data value at any pixel not corresponding to a color filter of interest. Thereafter, the Gr/Gb interpolation unit 204 performs an interpolation process using a lowpass filter (LPF) and calculates interpolated Gr data and interpolated Gb data having data at any of all pixels.

Figure 6:
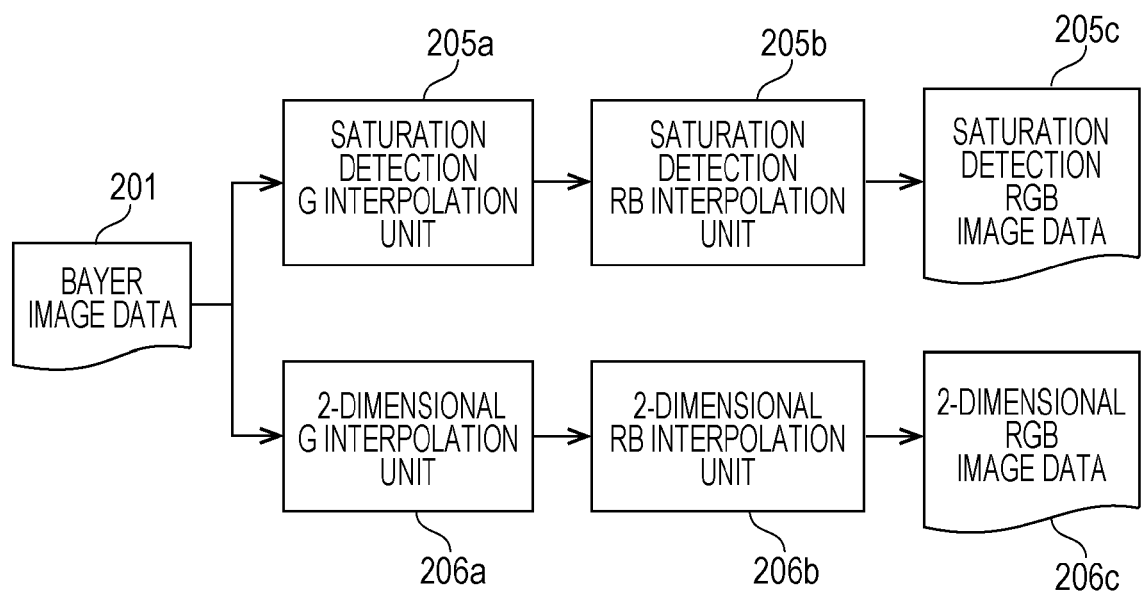
FIG. 6 is a diagram illustrating an example of a configuration of at least one embodiment of a saturation detection interpolation unit and that of at least one embodiment of a two-dimensional interpolation unit illustrated in FIG. 2.

The saturation detection interpolation unit 205 generates RGB image data for each pixel from the input Bayer image data 201 of the pixels. The interpolation process performed by the saturation detection interpolation unit 205 is described in further detail below with reference to FIG. 6. FIG. 6 is a diagram illustrating an example of a configuration of at least one embodiment of the saturation detection interpolation unit 205 and that of at least one embodiment of the two-dimensional interpolation unit 206. As illustrated in FIG. 6, the saturation detection interpolation unit 205 includes a saturation detection G interpolation unit 205*a* and a saturation detection RB interpolation unit 205*b*.

The saturation detection interpolation unit 205 first interpolates G data using the saturation detection G interpolation unit 205*a*, and then interpolates R data and B data using the saturation detection RB interpolation unit 205*b* so that RGB image data 205*c* is/are generated for use in saturation detection. In this process, if the interpolation for calculating the saturation is based on the calculation of the average of neighboring pixels, there is a possibility that color shifting or color fringing occurs, which makes the image have a different color from its true color. This may cause the saturation judgment for a local area to be incorrect. In the present embodiment, to handle the above situation, filter coefficients in the calculation of the saturation are selected so as to preserve edge portions (edge components) while suppressing the color shifting or the color fringing, which achieves an increase in accuracy of the saturation detection performed by the spurious resolution area judgment unit 209.

In the interpolation of G data by the saturation detection G interpolation unit 205*a*, when a pixel of interest is a pixel associated with the G filter color, the G data of this pixel is directly output. In the interpolation of G data by the saturation detection G interpolation unit 205*a*, when a pixel of interest is a pixel associated with the R filter color or when a pixel of interest is a pixel associated with the B filter color, the interpolation data is calculated according to formula (7) shown below using a secondary differential filter with coefficients such as those shown in FIG. 7. In FIG. 7, C pixels are R pixels or B pixels. In formula (7) shown below, for convenience, terms correspond to respective pixels denoted by similar symbols illustrated in FIG. 4.

$$G33=(-R13-R31+4\cdot R33-R35-R53)/8+(G23+G32+G34+G43)/4$$

$$G44=(-B24-B42+4\cdot B44-B46-B64)/8+(G34+G43+G45+G54)/4 \quad (7)$$

Note that the filter coefficients are not limited to the above-described examples, but other filter coefficients may be employed as long as edge components are preserved. Although in the present embodiment, the interpolation is performed using the secondary differential filter, which is a Laplacian filter, the interpolation may be performed adaptively such that a determination is made from neighboring pixels as to a direction in which good continuity is obtained, and the interpolation is performed in this direction to achieve the preservation of edges. For example, in the case of the R33 pixel in FIG. 4, the absolute value of the difference in pixel values in the vertical direction and that in the horizontal direction are calculated according to formula (8) shown below, and a determination is made as to in which direction the continuity is better.

$$H\text{diff}=|G32-G34|$$

$$V\text{diff}=|G23-G43| \quad (8)$$

When Hdiff<Vdiff, the continuity is better in the horizontal direction than in the vertical direction, and thus the saturation detection G interpolation unit 205*a* performs the interpolation using pixel data of pixels in the horizontal direction. In the opposite case, the saturation detection G interpolation unit 205*a* performs the interpolation using pixel data of pixels in the vertical direction.

The saturation detection RB interpolation unit 205*b* calculates the interpolated data of R and B in a similar manner to the above-described case in which formulae (4) to (6) are used.

When the two-dimensional interpolation unit 206 receives the Bayer image data 201 of the respective pixels, the two-dimensional interpolation unit 206 generates RGB image data of each pixel to be applied to a pixel region determined by the spurious resolution area judgment unit 209 as being a spurious resolution area. The interpolation process performed by the two-dimensional interpolation unit 206 is described below with reference to FIG. 6. As illustrated in FIG. 6, the two-dimensional interpolation unit 206 includes a two-dimensional G interpolation unit 206*a* and a two-dimensional RB interpolation unit 206*b*.

Figure 8:
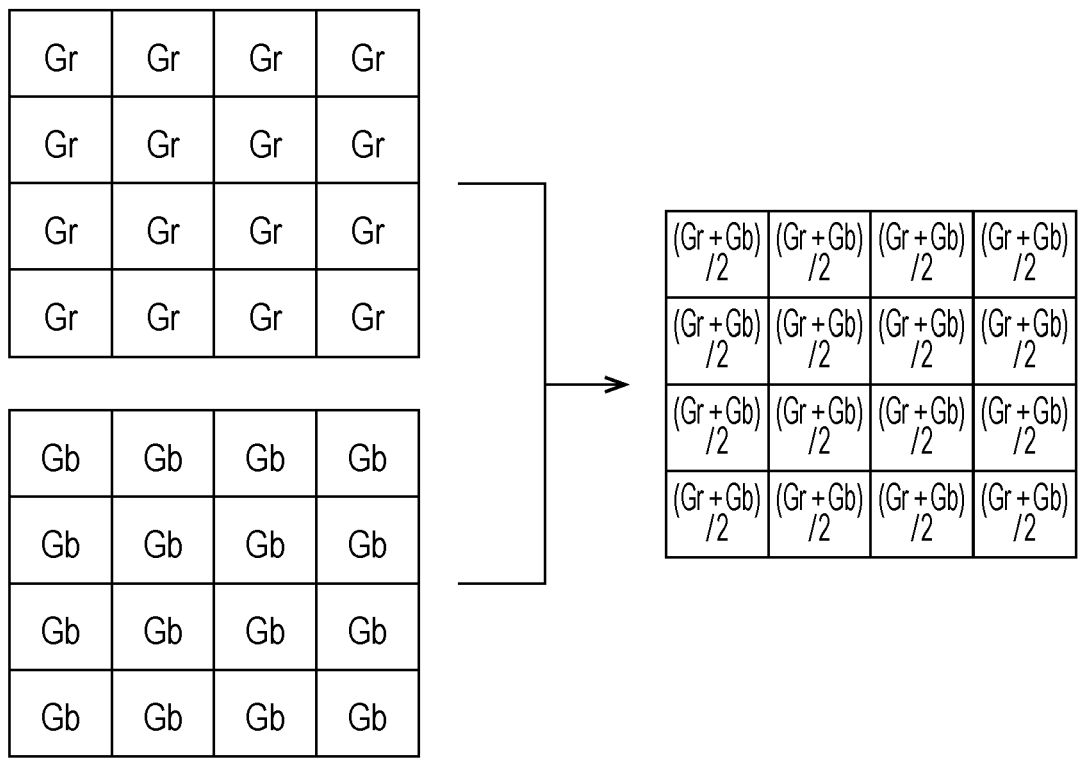
FIG. 8 is a diagram illustrating a process performed by a two-dimensional interpolation unit.

In the two-dimensional interpolation unit 206, first, the two-dimensional G interpolation unit 206*a* calculates the interpolated data of Gr and Gb having data at all pixels using a similar method to that used in the interpolation performed by the Gr/Gb interpolation unit 204. Furthermore, in the two-dimensional interpolation unit 206, the two-dimensional G interpolation unit 206*a* calculates the arithmetic mean of the Gr data and the Gb data at each pixel using Gr and Gb image data at each pixel as illustrated in FIG. 8. This makes it possible to delete the difference in data value between Gr pixels and Gb pixels. The resultant interpolated data is applied to an area determined as a spurious resolution area by the spurious resolution area judgment unit 209 to correct the spurious resolution.

Next, the two-dimensional interpolation unit 206 interpolates the R data and the B data using the two-dimensional RB interpolation unit 206*b*. The two-dimensional RB interpolation unit 206*b* calculates the interpolated data of R and B in a similar manner to the above-described case in which formulae (4) to (6) are used. As described above, RGB image data 206*c* is generated by calculating the interpolated data using pixels at least in two different directions.

Figure 9:
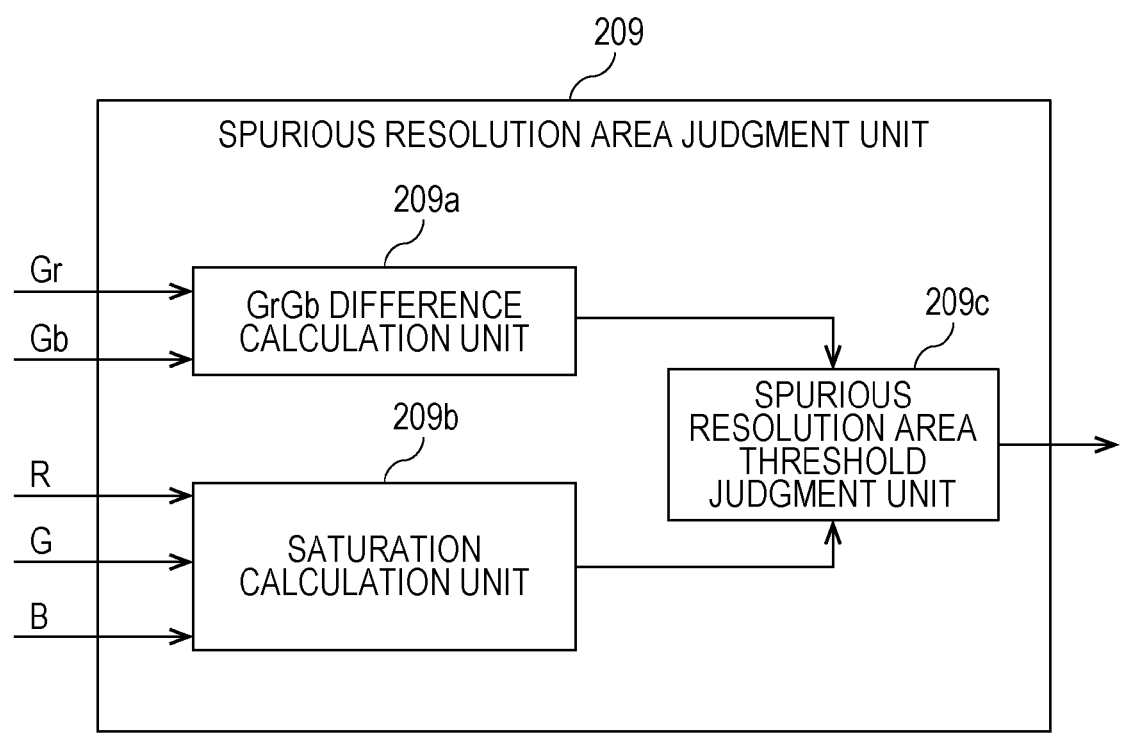
FIG. 9 is a diagram illustrating an example of a configuration of at least one embodiment of a spurious resolution area judgment unit illustrated in FIG. 2.
Figure 10:
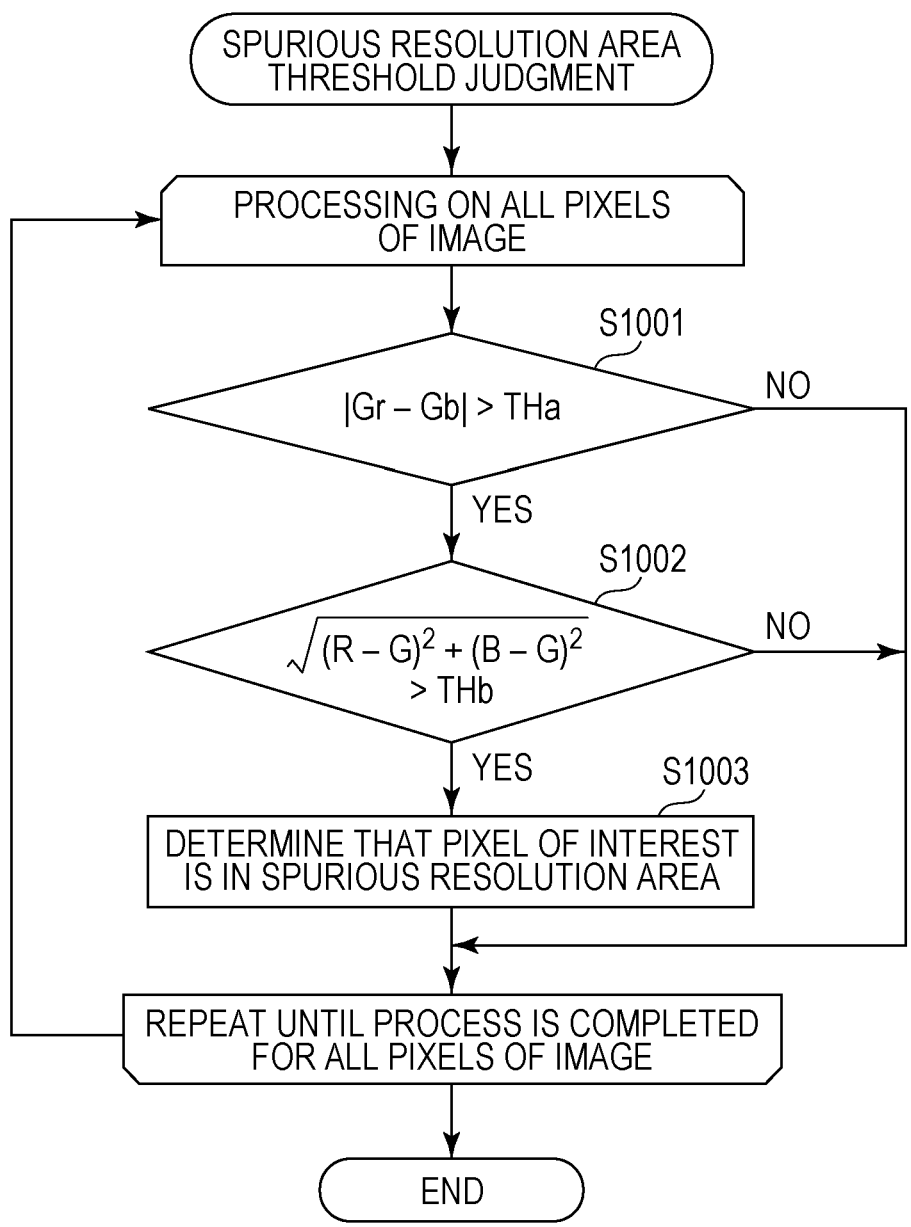
FIG. 10 is a flow chart illustrating an example of a spurious resolution area threshold judgment process.

The determination as to the spurious resolution area performed by the spurious resolution area judgment unit 209 illustrated in FIG. 2 is described below with reference to FIG. 9 and FIG. 10. FIG. 9 is a diagram illustrating an example of a configuration of the spurious resolution area judgment unit 209. FIG. 10 is a flow chart illustrating an example of a spurious resolution area threshold judgment process. As illustrated in FIG. 9, the spurious resolution area judgment unit 209 includes a GrGb difference calculation unit (difference detection unit) 209*a*, a saturation calculation unit 209*b*, and a spurious resolution area threshold judgment unit 209*c*.

The GrGb difference calculation unit 209*a* receives the Gr data and the Gb data output from the Gr/Gb interpolation unit 204, and detects a difference between the Gr data and the Gb data for each pixel by calculating the absolute value of the difference $G_{r-b}$ according to formula (9) shown below. The GrGb difference calculation unit 209b receives the RGB image data 205c for use in detecting the saturation from the saturation detection interpolation unit 205, and calculates the saturation C for each pixel according to formula (10) shown below.

$$G_{r-b} = |G_r - G_b| \qquad (9)$$

$$C = \sqrt{((R-G)^2 + (B-G)^2)} \qquad (10)$$

The spurious resolution area threshold judgment unit 209c determines, on a pixel-by-pixel basis whether a pixel of interest is in a spurious resolution area based on the value $G_{r-b}$ output from the GrGb difference calculation unit 209a and the saturation C output from the saturation calculation unit 209b. The spurious resolution area threshold judgment process performed by the spurious resolution area threshold judgment unit 209c is described below with reference to the flow chart shown in FIG. 10.

The spurious resolution area threshold judgment unit 209c compares the absolute value of the difference between the Gr data and the Gb data $G_{r-b}$ with a constant threshold value THa for a pixel of interest to determine whether the absolute value of difference $G_{r-b}$ is greater than the threshold value THa (S1001). In a case where the result indicates that the absolute value of difference $G_{r-b}$ is greater than the threshold value THa, then the spurious resolution area threshold judgment unit 209c further compares the saturation C with a constant threshold value THb to determine whether the saturation C is greater than the threshold value THb (S1002). In a case where the result indicates that the saturation C is greater than the threshold value THb, the spurious resolution area threshold judgment unit 209c determines that the pixel of interest is in a spurious resolution area (S1003). The spurious resolution area threshold judgment unit 209c performs steps S1001 to S1003 for each of all pixels.

In the spurious resolution area threshold judgment process, the absolute value of difference $G_{r-b}$ between the Gr data and the Gb data and the saturation C are compared with corresponding constant threshold values to make the determination described above, but the threshold values may be varied nonlinearly depending on the luminance, the hue, or the like. The threshold values may be varied by a user. There is a high probability that the saturation is high in a spurious resolution area. The spurious resolution area threshold judgment unit 209c may determine whether a pixel of interest is in a spurious resolution area for each pixel based on only the saturation C output from the saturation calculation unit 209b.

Figure 11:
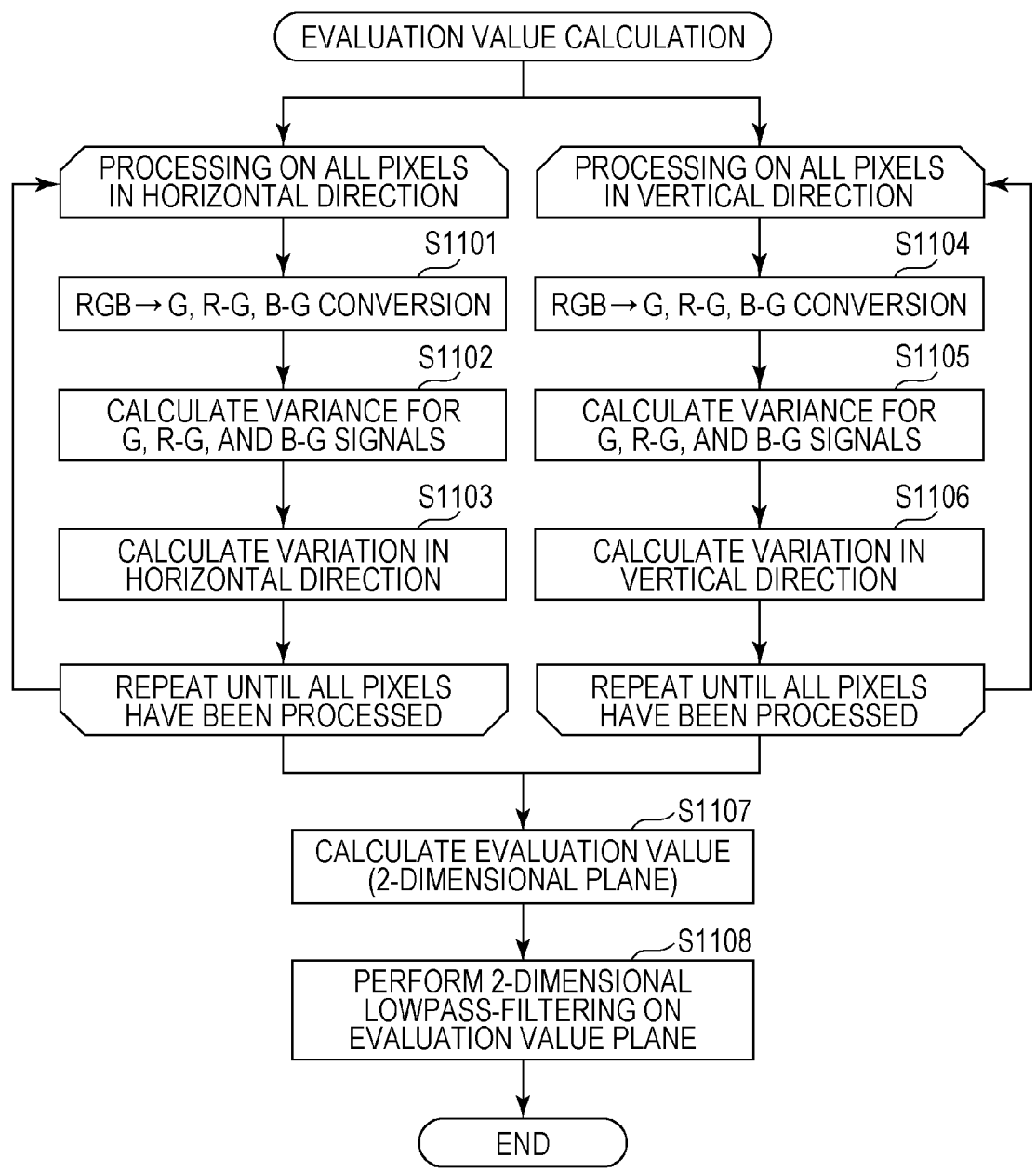
FIG. 11 is a flow chart illustrating an example of an evaluation value calculation process.

Next, an evaluation value calculation process according to the present embodiment is described below with reference to a flow chart shown in FIG. 11. The flow chart in FIG. 11 illustrates an example of the evaluation value calculation process.

In the evaluation value calculation process, the horizontal variance calculation unit 207 illustrated in FIG. 2 converts the horizontally interpolated RGB image data 202c having interpolated pixel data of missing colors at each pixel into a color signal (value) in an uniform color space (S1101). In the present embodiment, G, R-G, and B-G color spaces are used to calculate the variance of the color difference as a measure in terms of the uniformity. Although an L*a*b* uniform color space may be used instead of the G, R-G, and B-G color spaces, a large amount of calculation is necessary to make a conversion to L*a*b* values. In the present embodiment, in view of the above, a G signal is directly used instead of L*, and R-G and B-G are used as color difference signals instead of a* and b*.

Figure 12A:
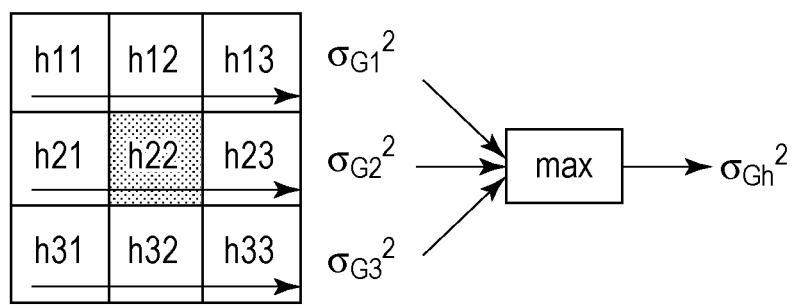
FIG. 12A is a diagram illustrating a 3×3 pixel area for use in explaining a process of calculating an evaluation value of a G signal.
Figure 12B:
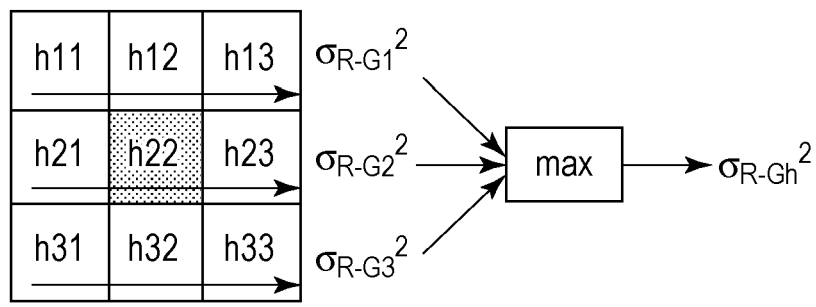
FIG. 12B is a diagram illustrating a 3×3 pixel area for use in explaining a process of calculating an evaluation value of a R-G signal.
Figure 12C:
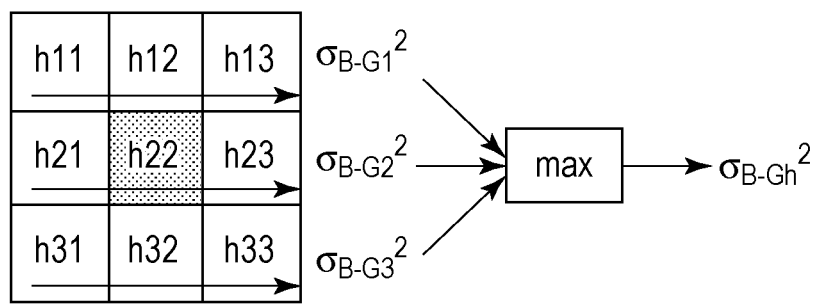
FIG. 12C is a diagram illustrating a 3×3 pixel area for use in explaining a process of calculating an evaluation value of a B-G signal.

Next, the horizontal variance calculation unit 207 calculates the variance $\sigma_{Gh}^2$ of the G signal, the variance $\sigma_{R-Gh}^2$ of the R-G signal, and the variance $\sigma_{B-Gh}^2$ of the B-G signal (S1102). Herein it is assumed by way of example that the calculations are performed using pixels in 3×3 area around a pixel of interest. Alternatively, pixels in an area with a different size, such as a 5×5 area or a 7×7 area, may be used. Instead of using all pixels in an area, part of the pixels in the area may be used. For example, the variance of the G signal in the horizontal direction may be calculated such that the variance $\sigma_{G1}^2$ of the G signal is calculated using h11 to h13, the variance $\sigma_{G2}^2$ is calculated using h21 to h23, and the variance $\sigma_{G3}^2$ is calculated using h31 to h33, as illustrated in FIG. 12A. Thereafter, a greatest variance $\sigma_{G2}^2$ is selected from the variance $\sigma_{G1}^2$, the variance $\sigma_{G2}^2$, and the variance $\sigma_{G3}$2, and the selected greatest variance is employed as the variance of the G signal. The variance of the R-G signal and the variance of the B-G signal may also be calculated in a similar manner to the calculation of the variance of the G signal, as illustrated in FIG. 12B and FIG. 12C.

Subsequently, the horizontal variance calculation unit 207 calculates the horizontal variance $\sigma_h^2$ according to formula (11) shown below (S1103). The horizontal variance calculation unit 207 performs the above-described process in steps S1101 to S1103 on a pixel-by-pixel basis for all pixels of the horizontally interpolated RGB image data 202c.

$$\sigma_h^2 = \sigma_{Gh}^2 + \sigma_{R-Gh}^2 + \sigma_{B-Gh}^2 \qquad (11)$$

The vertical variance calculation unit 208 performs a process in steps S1104 to S1106, in a similar manner to the process in steps S1101 to S1103, using the vertically interpolated RGB image data 203c according to formula (12) shown below to obtain the vertical variance $\sigma_v^2$. The vertical variance calculation unit 208 performs the above-described process in steps S1104 to S1106 on a pixel-by-pixel basis for all pixels of the vertically interpolated RGB image data 203c.

$$\sigma_v^2 = \sigma_{Gv}^2 + \sigma_{R-Gv}^2 + \sigma_{B-Gv}^2 \qquad (12)$$

Next, the evaluation value calculation unit 210 calculates the horizontal evaluation value Ch and the vertical evaluation value Cv for each pixel according to formula (13) shown below using the horizontal variance $\sigma_h^2$ and the vertical variance $\sigma_v^2$ calculated in the above-described manner. As a result of the process described above, the evaluation values Ch and Cv are calculated for each pixel, and a two-dimensional plane of evaluation values is generated (S1107).

$$C_h = \frac{\sigma_h^2}{\sigma_h^2 + \sigma_v^2} \qquad (13)$$

$$C_v = \frac{\sigma_v^2}{\sigma_h^2 + \sigma_v^2}$$

Figure 13A:
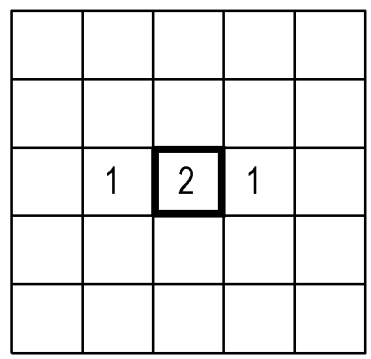
FIG. 13A is a diagram illustrating an example of a set of filter coefficients of a lowpass filter for three pixels used in calculating an evaluation value.
Figure 13B:
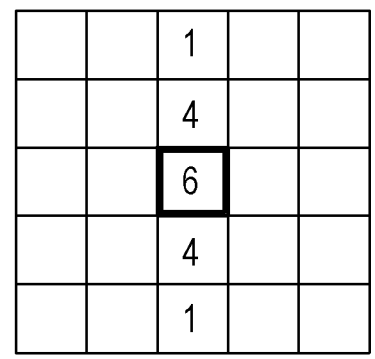
FIG. 13B is a diagram illustrating an example of a set of filter coefficients of a lowpass filter for five pixels used in calculating an evaluation value.

Note that final interpolated values are determined by evaluation values, and thus if there is a large difference in evaluation values between adjacent pixels, there is a possibility that a reduction in image quality, such as a tone jump or the like, occurs. To handle such a situation, the evaluation value calculation unit 210 performs a lowpass filtering (LPF) process on the generated evaluation plane (S1108). As for filter coefficients of the LPF, for example, filter coefficients [1, 2, 1] of a filter length of 3 pixels illustrated in FIG. 13A may be used, or filter coefficients [1, 4, 6, 4, 1] of a filter length of 5 pixels illustrated in FIG. 13B may be used. Note that it may be advantageous to perform the filtering process in both vertical and horizontal directions.

The image generation unit 211 selects pixel data for each pixel from the horizontally interpolated pixel data, the vertical interpolated image data, and the two-dimensionally interpolated pixel data based on the evaluation values Ch and Cv obtained as results of the evaluation calculated by the evaluation value calculation unit 210 and the judgment result made by the spurious resolution area judgment unit 209. Thus the image generation unit 211 generates interpolated RGB image data having R, G, and B color components at each of all pixels and outputs the result as interpolated RGB image data 212 (demosaiced data).

Figure 14:
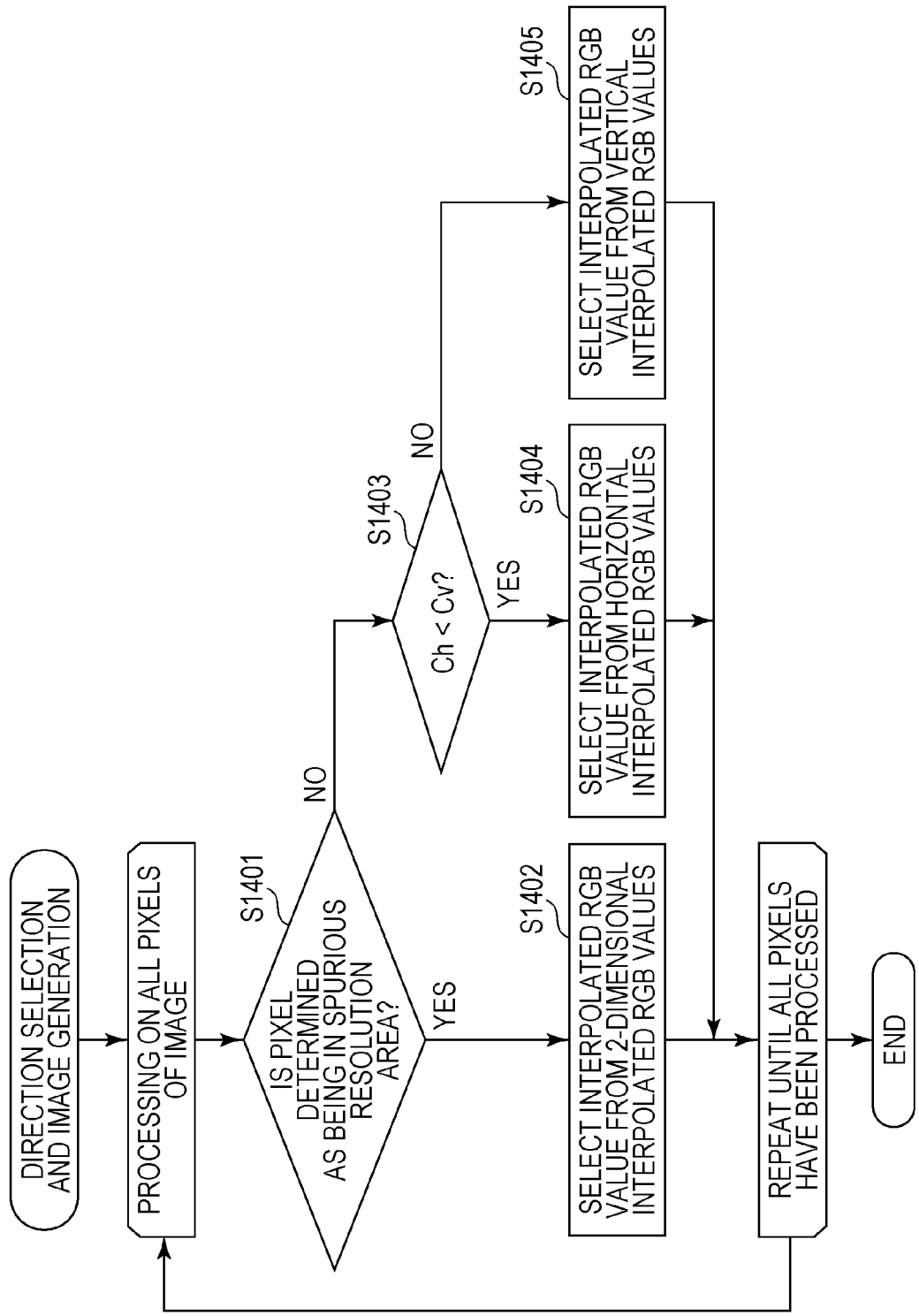
FIG. 14 is a flow chart illustrating an example of an image generation process.

Next, an image generation process performed by the image generation unit 211 is described below with reference to FIG. 14. FIG. 14 is a flow chart illustrating an example of the image generation process. The image generation unit 211 first determines whether a pixel of interest is determined as being in a spurious resolution area (S1401). If the pixel of interest is determined as being in a spurious resolution area, the image generation unit 211 selects the RGB image data 206c generated via the interpolation process performed by the two-dimensional interpolation unit 206, and outputs the selected data as interpolated RGB image data 212 (S1402).

On the other hand, in a case where the pixel of interest is not determined as being in a spurious resolution area, the image generation unit 211 compares the horizontal evaluation value Ch with the vertical evaluation value Cv to determine whether the horizontal evaluation value Ch is smaller than the vertical evaluation value Cv (S1403). In a case where it is determined that the horizontal evaluation value Ch is smaller than the vertical evaluation value Cv, the image generation unit 211 selects and outputs the horizontally interpolated RGB image data 202c as the interpolated RGB image data 212 (S1404). On the other hand, in a case where it is determined that the horizontal evaluation value Ch is not smaller than the vertical evaluation value Cv, the image generation unit 211 selects and outputs the vertically interpolated RGB image data 203c as the interpolated RGB image data 212 (S1405).

In the first embodiment, as described above, the determination is performed as to whether a pixel of interest is in an area in which a spurious resolution may occur, on a pixel-by-pixel basis based on the saturation calculated from the saturation detection RGB image data generated via the interpolation process performed so as to preserve edge portions while suppressing color shifting or color fringing, and the difference between the Gr data and the Gb data. In a case where a pixel of interest is determined as being in an area in which a spurious resolution may occur, the interpolated data generated by the two-dimensional interpolation unit is selected as pixel data for this pixel of interest. By detecting the area in which a spurious resolution may occur (pixel) with high accuracy as described above, it becomes possible to more properly correct the spurious resolution that occurs during the demosaicing process (color interpolation process) and thus it becomes possible to perform the demosaicing process on the image signal with high accuracy.

Second Embodiment

Next, a second embodiment is described.

In the first embodiment described above, when the interpolation for the G data is performed by the saturation detection G interpolation unit 205a of the saturation detection G interpolation unit 205, if a pixel of interest is a pixel associated with the R filter color or the B filter color, coefficients of the secondary differential filter, such as those illustrated in FIG. 7, are used. On the other hand, in the second embodiment, a first order differential filter is used in the interpolation of the G data. In the second embodiment, the configuration of the image pickup apparatus and that of the demosaicing unit 105 are substantially similar to those according to the first embodiment described above with reference to FIG. 1 and FIG. 2, and thus a duplicated description thereof is omitted. However, the internal structure of the saturation detection interpolation unit 205 according to the second embodiment is different from that according to the first embodiment.

Figure 15:
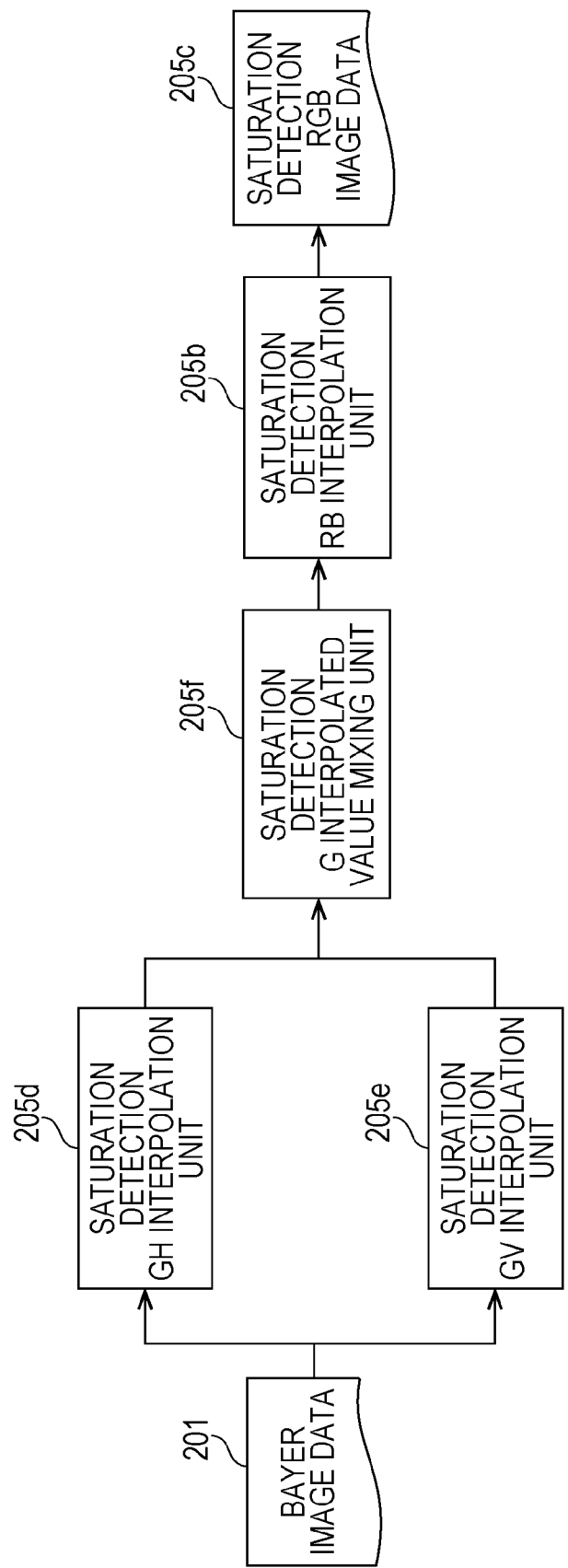
FIG. 15 is a diagram illustrating an example of a configuration of a saturation detection interpolation unit according to a second embodiment.

FIG. 15 is a diagram illustrating an example of an internal configuration of at least one embodiment of the saturation detection interpolation unit 205 according to the second embodiment. As illustrated in FIG. 15, the saturation detection interpolation unit 205 includes a saturation detection GH interpolation unit 205d, a saturation detection GV interpolation unit 205e, a saturation detection G interpolated value mixing unit 205f, and a saturation detection RB interpolation unit 205b.

In the interpolation of the G data by the saturation detection GH interpolation unit 205d according to the second embodiment, when a pixel of interest is a pixel associated with the G filter color, the G data of this pixel of interest is directly output. In the interpolation of G data by the saturation detection GH interpolation unit 205d, when a pixel of interest is a pixel associated with the R filter color or the B filter color, interpolation is performed according to formula (14) shown below using a first order differential filter with coefficients determined taking into account a gradient in the horizontal direction as illustrated in FIG. 16A. In formula (14) shown below, for convenience, terms corresponds to respective pixels denoted by similar symbols illustrated in FIG. 4.

$$G33=(-R31+R35)/2+(G32+G34)/2$$

$$G44=(-B42+B46)/2+(G43+G45)/2 \quad (14)$$

Furthermore, in the interpolation of G data by the saturation detection GV interpolation unit 205e, when a pixel of interest is a pixel associated with the R filter color or the B filter color, the interpolation is performed according to formula (15) shown below using the first order differential filter with coefficients determined taking into account a gradient in the vertical direction as illustrated in FIG. 16B.

$$G33=(-R13+R53)/2+(G23+G43)/2$$

$$G44=(-B24+B64)/2+(G34+G54)/2 \quad (15)$$

In FIG. 16A and FIG. 16B, C pixels are R pixels or B pixels. The filter coefficients are not limited to the examples illustrated in FIG. 16A and FIG. 16B. For example, the weighting factor for the R pixels may be set to a value other than 1.

The saturation detection G interpolated value mixing unit 205f calculates the arithmetic mean of the G data at locations of interpolated R and B pixels based on the interpolated data generated by the saturation detection GH interpolation unit 205d and the interpolated data generated by the saturation detection GV interpolation unit 205e. The saturation detection RB interpolation unit 205b performs interpolation of R data and B data in a similar manner to the case where the interpolation is performed using formulae (4) to (6) according to the first embodiment. The following process after the above is performed in a similar manner as in the first embodiment, and thus a further description thereof is omitted.

In the second embodiment, as described above, interpolated data for use in detecting the saturation is generated using the first order differential filter so as to preserve edge components. This makes it possible, as in the first embodiment, to suppress color fringing and color shifting and detect an area in which a spurious resolution may occur (pixel) with high accuracy to make it possible to more properly correct a spurious resolution that occurs during the demosaicing process (color interpolation process).

Other Embodiments

Embodiment(s) of the present inventions can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method or methods performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), etc.) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-091875, filed Apr. 25, 2014, which is hereby incorporated by reference herein in its entirety.

What is claimed is:
1. An image processing apparatus that processes mosaic image data produced via a photoelectric conversion on an optical image of an object image by an image sensor including a color filter having a plurality of colors, the mosaic image data having image data of pixels each corresponding to one of the plurality of colors of the color filter, the image processing apparatus comprising:
   a first interpolation unit configured to perform an interpolation process on a pixel-by-pixel basis on a pixel of interest using image data of pixels located close to the pixel of interest in each of a plurality of prescribed directions so as to reproduce image data of colors missing at the pixel of interest;
   an evaluation unit configured to evaluate the image data in each prescribed direction subjected to the interpolation process by the first interpolation unit;
   a second interpolation unit configured to perform an interpolation process so as to preserve an edge component of the object image;
   a saturation detection unit configured to detect a saturation from the image data subjected to the interpolation process by the second interpolation unit;
   a judgment unit configured to judge whether a pixel is in an area in which a spurious resolution may occur, on a pixel-by-pixel basis based on the saturation detected by the saturation detection unit; and
   an image generation unit configured to select image data to be interpolated for each pixel based on a result of the evaluation by the evaluation unit and a result of the judgment by the judgment unit, and to generate interpolated image data with the plurality of colors.

2. The image processing apparatus according to claim 1, wherein, when an image of interest is determined by the judgment unit as being in an area in which a spurious resolution may occur, the image generation unit selects, for the pixel of interest, image data obtained via the interpolation process using image data of pixels that are located close to the pixel of interest in two different directions.

3. The image processing apparatus according to claim 1, further comprising:
   a difference detection unit configured to detect a difference between image data,
   wherein the mosaic image data is image data of a Bayer pattern,
   the difference detection unit detects a difference between image data of a pixel corresponding to green located in a horizontal line in which a pixel corresponding to red is located and image data of a pixel corresponding to green located in a horizontal line in which a pixel corresponding to blue is located, and
   the judgment unit is further configured to determine whether the pixel of interest is in an area in which a spurious resolution may occur, on a pixel-by-pixel basis based on the difference detected by the difference detection unit and the saturation detected by the saturation detection unit.

4. The image processing apparatus according to claim 3, wherein, in a case where the difference detected by the difference detection unit is greater than a first threshold value and the saturation detected by the saturation detection unit is greater than a second threshold value, the judgment unit determines that the pixel of interest is in an area in which a spurious resolution may occur.

5. The image processing apparatus according to claim 1, further comprising:
   a correction unit configured to perform a white balance process on the mosaic image data,
   wherein at least one of the first interpolation unit and the second interpolation unit performs the interpolation process on the mosaic image data subjected to the white balance process performed by the correction unit.

6. The image processing apparatus according to claim 1, wherein the second interpolation unit performs the interpolation process using a secondary differential filter.

7. The image processing apparatus according to claim 1, wherein the second interpolation unit performs the interpolation process using a Laplacian filter.

8. The image processing apparatus according to claim 1, wherein the second interpolation unit performs the interpolation process using a first order differential filter.

9. The image processing apparatus according to claim 1, wherein the second interpolation unit evaluates directional continuity using nearby pixels, and performs the interpolation process using image data of pixels located in a direction in which continuity is determined as being high compared to another direction in which continuity is determined to be lower.

10. The image processing apparatus according to claim 1, wherein the mosaic image data is image data of a Bayer pattern, and
the evaluation unit performs the evaluation using variances of a G signal, a R-G signal, and a B-G signal obtained from the image data subjected to the interpolation process performed by the first interpolation unit.

11. The image processing apparatus according to claim 1, wherein the plurality of prescribed directions include a horizontal direction and a vertical direction.

12. An image processing method for processing mosaic image data produced via a photoelectric conversion on an optical image of an object image by an image sensor including a color filter having a plurality of colors, the mosaic image data having image data of pixels each corresponding to one of the plurality of colors of the color filter, the image processing method comprising:
   performing a first interpolation process on a pixel-by-pixel basis on a pixel of interest using image data of pixels located close to the pixel of interest in each of a plurality of prescribed directions so as to reproduce image data of colors missing at the pixel of interest;
   evaluating the image data in each prescribed direction subjected to the interpolation process in the first interpolation process;
   performing a second interpolation process including performing an interpolation process so as to preserve an edge component of the object image;
   detecting a saturation from the image data subjected to the interpolation process in the second interpolation process;
   judging whether a pixel is in an area in which a spurious resolution occurs, on a pixel-by-pixel basis based on the detected saturation; and
   generating interpolated image data with the plurality of colors by performing interpolation on image data selected for each pixel based on a result of the evaluation step and a result of the judgment step.

13. A non-transitory computer-readable storage medium storing a program configured to cause a computer to execute an image processing method, the image processing method comprising:
   for mosaic image data produced via a photoelectric conversion on an optical image of an object image by an image sensor including a color filter having a plurality of colors, the mosaic image data having image data of pixels each corresponding to one of the plurality of colors of the color filter,
   performing a first interpolation process on a pixel-by-pixel basis on a pixel of interest using image data of pixels located close to the pixel of interest in each of a plurality of prescribed directions so as to reproduce image data of colors missing at the pixel of interest;
   evaluating the image data in each prescribed direction subjected to the interpolation process in the first interpolation process;
   performing a second interpolation process including performing an interpolation process so as to preserve an edge component of the object image;
   detecting a saturation from the image data subjected to the interpolation process in the second interpolation process;
   judging whether a pixel is in an area in which a spurious resolution may occur, on a pixel-by-pixel basis based on the detected saturation; and
   generating interpolated image data with the plurality of colors by performing interpolation on image data selected for each pixel based on a result of the evaluation step and a result of the judgment step.

* * * * *